United States Patent
Berg et al.

(10) Patent No.: US 7,280,046 B2
(45) Date of Patent: Oct. 9, 2007

(54) STEERING SYSTEM WITH HAPTIC DRIVER WARNING

(75) Inventors: Frederick J. Berg, Auburn, MI (US); Timothy J. Bennett, Kawkawlin, MI (US); Alan C. Davis, Fenton, MI (US); Richard K. Riefe, Saginaw, MI (US); Ronald H. Dybalski, Oak Park, MI (US); Timothy M. Phillips, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 167 days.

(21) Appl. No.: 11/153,096

(22) Filed: Jun. 15, 2005

(65) Prior Publication Data

US 2007/0008083 A1    Jan. 11, 2007

(51) Int. Cl.
*G08B 23/00* (2006.01)
(52) U.S. Cl. ............ 340/576; 340/407.1; 340/425.5; 340/438; 340/457; 340/575
(58) Field of Classification Search .......... 340/575, 340/576, 438, 439, 457, 465, 965, 407.1, 340/425.5; 345/156; 280/271; 701/41, 701/42

See application file for complete search history.

(56) References Cited

U.S. PATENT DOCUMENTS

| | | | |
|---|---|---|---|
| 6,285,279 B1 * | 9/2001 | Yamazaki | 340/432 |
| 2001/0048362 A1 * | 12/2001 | Spencer | 340/425.5 |
| 2003/0025597 A1 * | 2/2003 | Schofield | 340/435 |
| 2003/0034954 A1 | 2/2003 | Sakamaki et al. | |
| 2003/0088352 A1 | 5/2003 | Bullinger et al. | 701/41 |
| 2004/0090321 A1 | 5/2004 | Keutz | |
| 2005/0030166 A1 | 2/2005 | Kraus et al. | 340/407.1 |

FOREIGN PATENT DOCUMENTS

| | | |
|---|---|---|
| DE | 199 20 848 | 5/2000 |
| DE | 102 61 866 | 7/2004 |
| EP | 0 348 691 A2 | 1/1990 |
| EP | 0 856 432 A2 | 8/1998 |

OTHER PUBLICATIONS

European Search Report dated Sep. 1 2006.

* cited by examiner

*Primary Examiner*—Brent A. Swarthout
(74) *Attorney, Agent, or Firm*—Michael D. Smith

(57) ABSTRACT

A steering column assembly (18) of the type for controlling one or more steerable wheels in a motor vehicle includes a steering wheel (14) interface secured to the free end of a steering column (20). The steering column assembly (18) includes powered telescope adjust and tilt adjust features which a driver (16) uses to adjust the position of the steering wheel (14) for maximum comfort. One or more condition sensors (48) monitor numerous parameters about the vehicle. When an emergency condition is detected, such as the seat belt warning, a door that is ajar, various engine conditions, or erratic driving activity, a haptic controller (50) rapidly vibrates the steering wheel (14) through the telescoping and tilt adjusting motors (32, 40) as a means of alerting the driver (16) to the emergency condition. These warnings can be given priority so that a first warning is communicated by steering wheel (14) vibrations in one direction, and a second warning is communicated by vibrations in both the first direction and a second direction simultaneously. In addition, a third warning can be given emphasis by increasing the power of the vibration to a resonance mode to cause an audible warning.

14 Claims, 4 Drawing Sheets

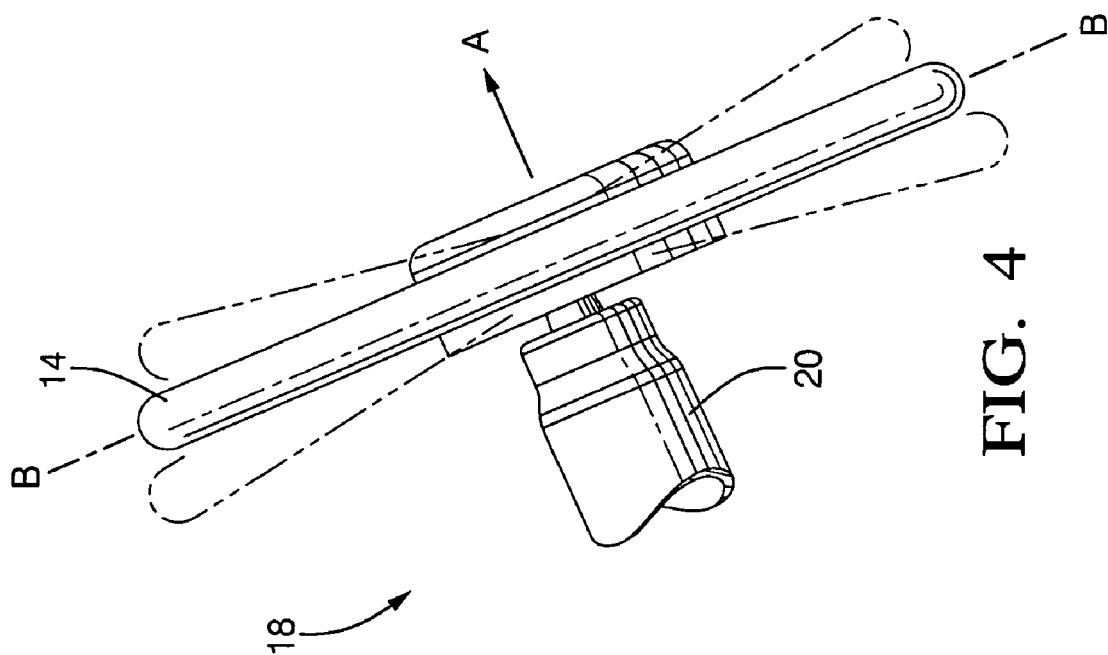
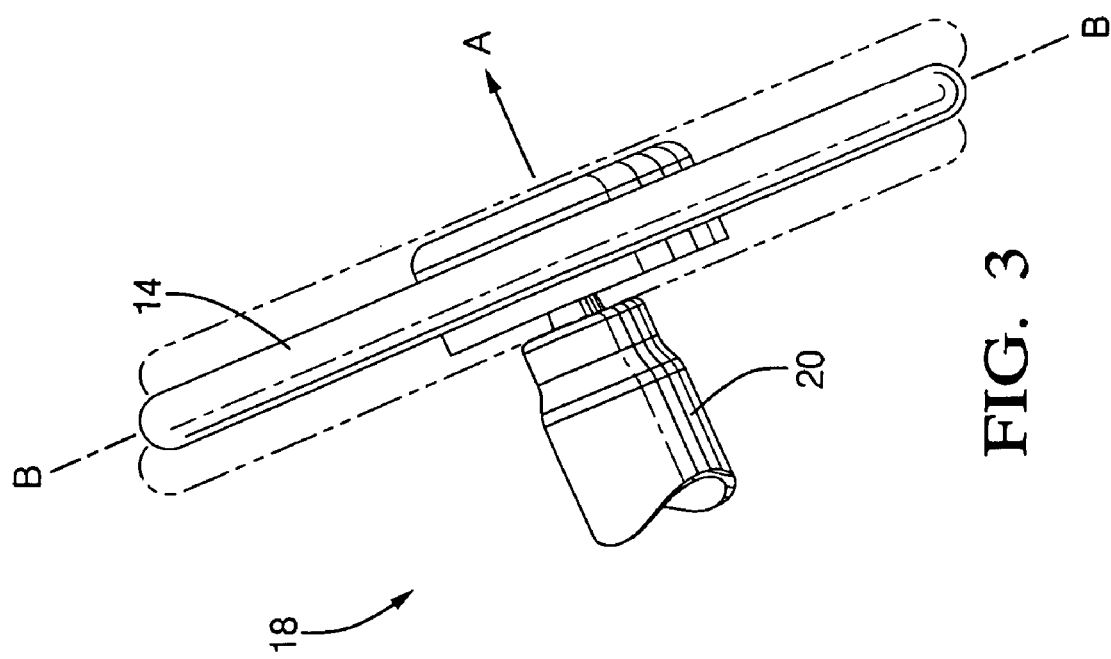

STEERING SYSTEM WITH HAPTIC DRIVER WARNING

FIELD OF THE INVENTION

This invention relates to a steering column assembly for operating a vehicle, and more particularly toward a steering column assembly and steering method for alerting a driver to an emergency condition.

BACKGROUND OF THE INVENTION

When operating a motor vehicle, a driver must be notified of all conditions which might jeopardize safety or affect proper operation of the vehicle. For examples, an ajar door or engine malfunction is commonly detected by a built-in sensor and the status of that condition announced by a dashboard light, message, chime, or sometimes a verbal recorded message. Upon notification, a driver can then take corrective action.

In the case of motor vehicles, there have been various proposals put forward to enhance driver focus to the detection of an emergency condition. Such proposals have included the incorporation of vibrating units mounted within a steering wheel which generate mechanical vibrations perceivable by touch and ear of the driver.

In airplanes, a device called a "shaker stick" is used to alert the pilot to an emergency, such as an impending stall. A particular disadvantage of these prior art systems for motor vehicles resides in the fact that the mechanical vibrations generated in the steering wheel are often indistinguishable from normally occurring vibrations in non-emergency situations. For example, an out of balance tire or rough road can result in perceived vibrations in the steering wheel which are indistinguishable from those created by the prior art vibrating units.

Accordingly, there exists a need for a vehicular steering system which will help focus driver attention to an emergency condition, and can be readily distinguished from normal occurring operating conditions, such as road vibrations.

SUMMARY OF THE INVENTION AND ADVANTAGES

The subject invention overcomes the limitations and disadvantages of the prior art by providing a steering column assembly of the type for controlling one or more steerable wheels in a vehicle. The assembly comprises a steering column having a free end. A steering axis extends from the free end. A steering wheel is secured to the free end of the steering column for manual rotation by a driver in a geometric plane generally perpendicular to the steering axis. An adjustment actuator is provided for relocating the rotation plane of the steering wheel to improve driver comfort. Examples of adjustment actuators can include powered telescoping features and powered tilt or rake adjust actuators. A sensor is incorporated into the vehicular electronics system for detecting the occurrence of an emergency condition. By way of example only, an emergency condition may be an unfastened seat belt, a door ajar, an engine alert, a driver drowsiness symptom, or an unsafe lane change detection. A haptic controller is responsive to the sensor for automatically energizing the adjustment actuator in response to the detection of the emergency condition so that driver attention to the emergency is focused by the unexpected movement of the steering wheel to a different rotation plane.

The haptic controller may operate in conjunction with prior art warning features such as chimes or visual dashboard signals, and uses the existing adjustment actuator for moving the steering wheel in either a telescoping or a tilting/raking direction. The telescope and/or tilt/rake movements of the steering wheel can be readily distinguished by a driver from the normally occurring vibrations in non-emergency situations. The driver's attention is thus drawn to the emergency and corrective action can be taken.

According to another aspect of the invention, a steering column assembly of the type for controlling one or more steerable wheels comprises a steering column having a free end and a steering axis extending from the free end. A steering wheel is secured to the free end of the steering column for manual rotation by a driver in a plane generally perpendicular to the steering axis. A column support is coupled to the steering column for mounting the steering column to the support structure in a vehicle. A sensor monitors and detects the occurrence of an emergency condition. A haptic controller is responsive to the sensor for automatically moving the rotation plane of the steering wheel in rapid short reversing directions in response to the detection of the emergency condition so that driver attention to the emergency condition is focused by the unexpected movement of the steering wheel. According to this aspect of the invention, rapid reversing movements of the steering wheel toward and away from its original rotation plane creates an unusual sensation for the driver thereby prompting the driver to address the emergency condition immediately.

According to yet another aspect of the invention, a method of alerting a vehicle driver to an emergency condition comprises the steps of: changing the directional course of the vehicle by manually rotating a steering wheel in a rotation plane, detecting an emergency condition, and automatically moving the rotation plane of the steering wheel in rapid short reversing directions in response to the detection of the emergency condition so that driver attention to the emergency condition is focused by the unexpected movement of the steering wheel in rapid short reversing directions. The rapid short reversing directions of the steering wheel toward and away from its original rotation plane creates an unusual and potentially concerning sensation for the driver, thereby prompting immediate attention to the emergency.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a fragmentary side view of a steering wheel whose rotation plane is being translated back and forth;

FIG. 4 is a side view as in FIG. 3 but showing the rotation plane of the steering wheel being tilted back and forth by the haptic controller.

DETAILED DESCRIPTION OF THE PREFERRED EMBODIMENT

Figure 1:
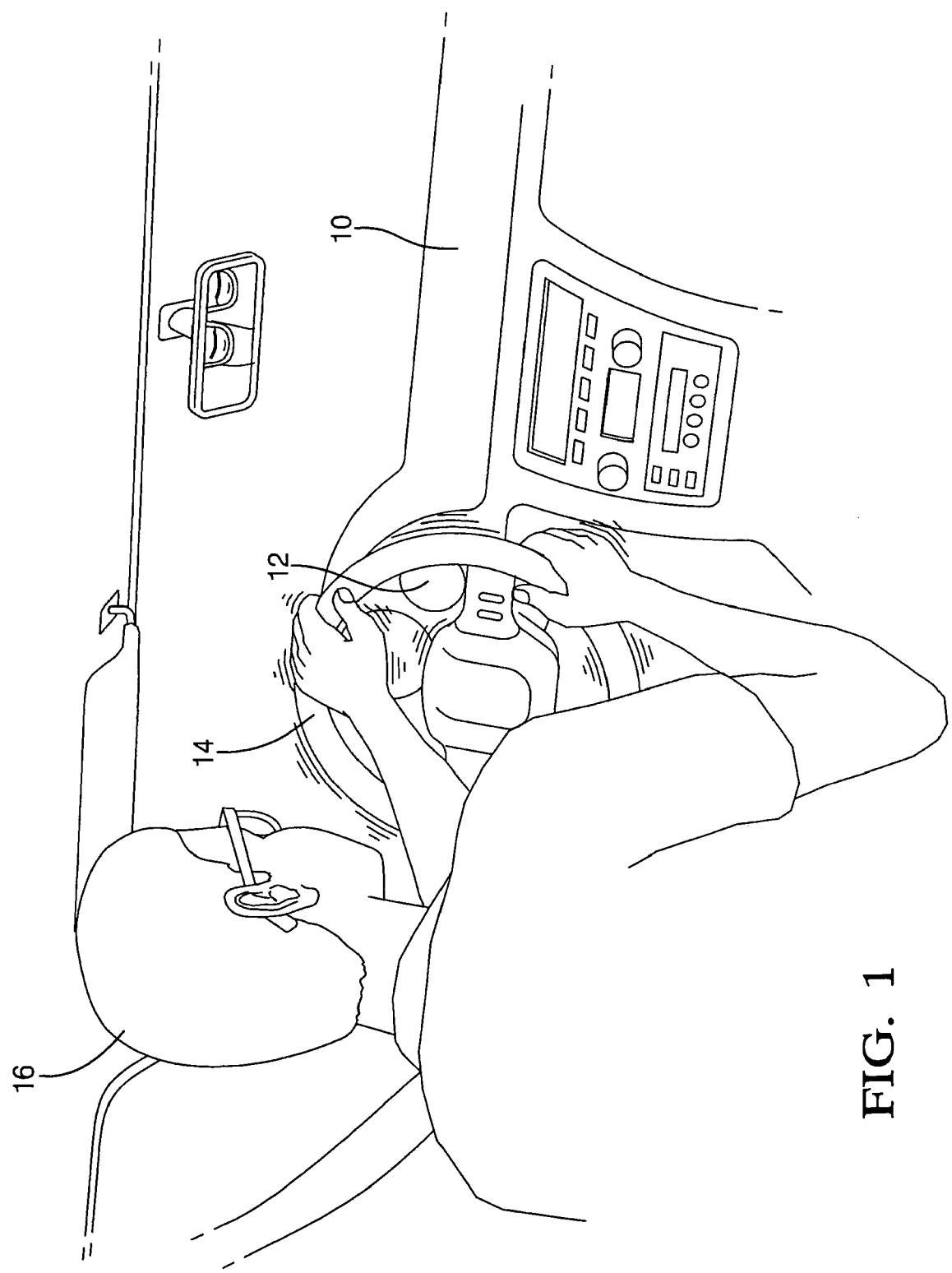
FIG. 1 is a perspective view of a driver operating a motor vehicle and who's attention is being focused by the unexpected movement of the steering wheel toward and away from its original rotation plane by the subject haptic warning system.

Referring to the figures wherein like numerals indicate like or corresponding parts throughout the several views, FIG. 1 illustrates a fragmentary interior perspective view of a motor vehicle including a dash board 10 with an inset instrument cluster 12. A steering wheel 14 is supported for rotation generally in front of the instrument cluster 12 and adapted to be grasped manually by a driver 16. By manually rotating the steering wheel 14, the driver 16 controls one or more steerable wheels of the vehicle.

Figure 2:
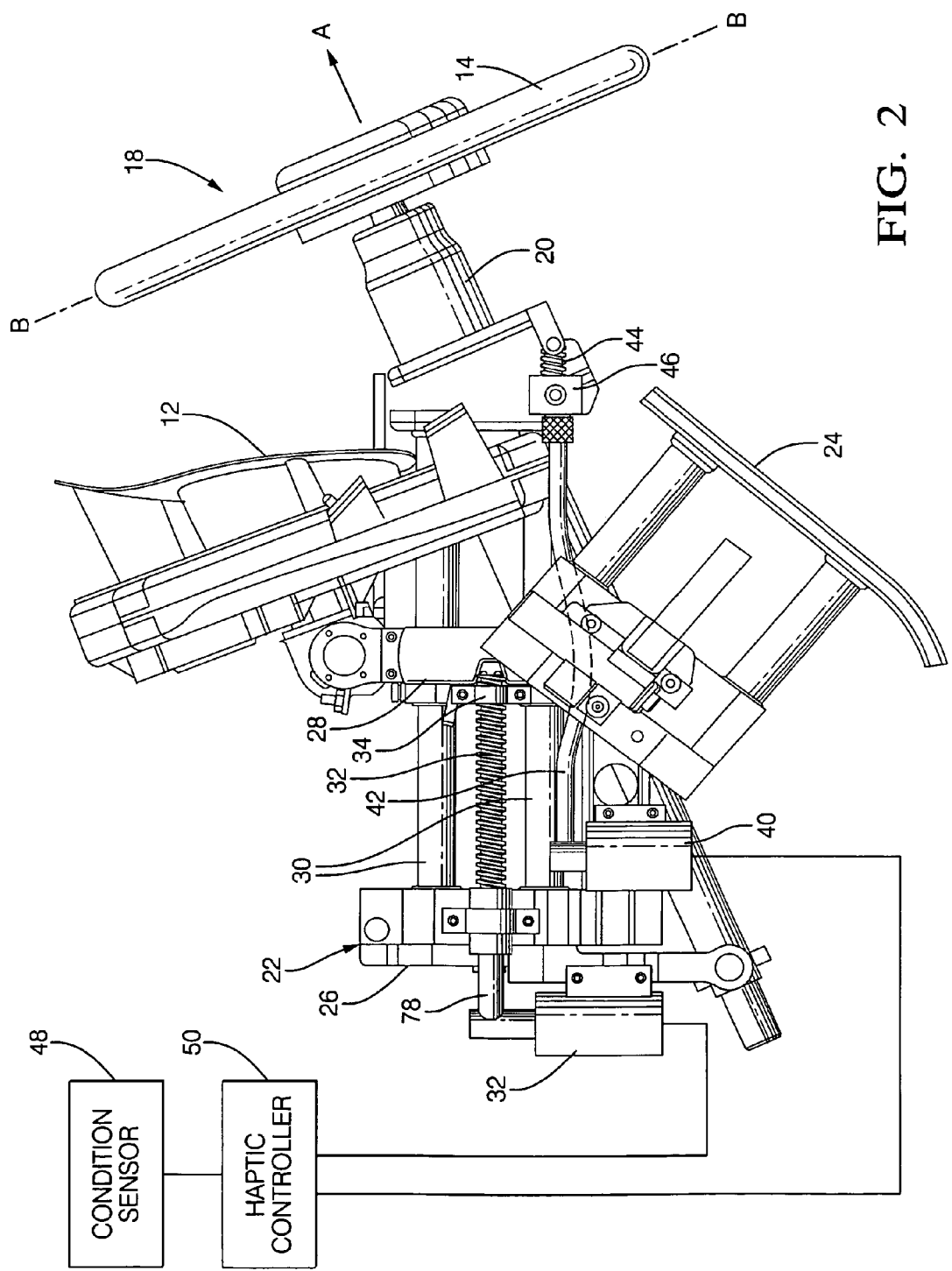
FIG. 2 is a side elevation view of an exemplary steering column assembly including adjustment actuators for relocating the rotation plane of the steering wheel in telescoping and tilting directions, with a haptic controller operatively connected to the adjustment actuators according to the invention.

The steering wheel 14 may be supported by any number of methods and components, but is shown in FIG. 2 in one exemplary fashion. Here, a steering column assembly is generally shown at 18. The steering wheel 14, which is a component of the steering column assembly 18, is rotatably supported on the free end of a steering column 20 for rotation about a steering axis A within a generally perpendicular, or normal, geometric plane B-B. A column support, generally indicated at 22 is coupled to the steering column 20 for the purposes of mounting to a support structure in a vehicle, preferably below the dash board 10. The column support 22 can take any of the known forms, including designs which incorporate energy absorbing devices activated during a frontal collision. The steering column assembly 18 may be provided with an optional knee bolster 24 for protecting the knees of the driver 16 in the event of an accident. The knee bolster 24 is supported by the column support 22 and will assist in absorbing the impact caused when the driver 16 is propelled toward the steering column assembly 18.

Preferably, although not necessarily, the steering column assembly 18 may be of the type for adjustably supporting the steering wheel 14 so that a driver 16 can adjust its angular and/or telescopic position for maximum comfort. In such a situation, the column support 22 may be composed of at least two components, one being a fixed mounting bracket 26, which is attached securely to the vehicle's support structure (such as the firewall or a dash board framework), and a moveable structure such as carriage housing support 28 which is carried on the mounting bracket 26. In the example of FIG. 2, the mounting bracket 26 includes a plurality of parallel guide tubes 30 along which the carriage housing support 28 slides. However, other mechanical configurations are possible, including the more traditional tilting column jacket style system. The steering column 20 is joined to the carriage housing support 28 so that an operator can adjust its position in the fore-aft (i.e., reach) direction relative to the mounting bracket 26.

A telescope actuator may be employed to control the telescoping motion of the steering column 20. The telescope actuator includes a servo-motor 32 affixed to the mounting bracket 26. The motor 32 drives a power screw 34. A nut 36, in this example, is affixed to the carriage housing support 28 and threadably receives the power screw 34 so that the carriage housing support 28 is pushed or pulled along the guide tubes 30 whenever the reversible motor 32 is actuated. The telescope actuator is controlled through an operator control device, such as a switch, and can be conveniently located anywhere within the vehicle enclosure. For example, the control switch can be integrated into the steering wheel 14 or on the column tree. Alternatively, the telescope actuator can be of any other type known in the art, including hydraulic, pneumatic, electromagnetic, or the like.

Furthermore, the steering column assembly 18 can include a tilt actuator which provides motor driven tilt adjustments to the steering wheel 14. (The term "tilt" is used in its broadest sense to include all tilting, angular, and raking adjustments of the steering wheel 14.) More specifically, a tilting bracket 38 is incorporated into the steering column 20. If deployed in a steering assembly which provides telescopic adjustment, the tilting bracket 38 is moveably carried on the carriage housing support 28 or by other corresponding structures. In non-telescoping applications, the tilting bracket 38 may be supported directly on the mounting bracket 26 or on the column jacket. The tiling bracket 38 allows for angular adjustment of the steering column 20 to accommodate driver comfort and preferences.

The tilt actuator includes a servo-motor 40 affixed to the mounting bracket 26. A flexible drive shaft 42 is rotatably coupled to the motor 40 and drives a power screw 44. The free end of the power screw 44 is pivotally joined to the tilting bracket 38 via a front pin, whilst the working length of the power screw 44 passes through a nut 46. As the power screw 44 is rotated in reversing directions by the motor 40, the power screw 44 pushes and pulls the tilting bracket 38 via the front pin to adjust its angular position and thus the angular position of the steering wheel 14. The motor 40 is controlled by the driver 16 via a switch located in a convenient location. Those skilled in the art will appreciate that other screw and nut arrangements can be substituted with equal effect, as well as alternative actuator mechanisms used for the tilt adjust feature. For example, the drive screw mechanisms can be replaced with hydraulic actuators, pneumatic actuators, motor driven linkages, electromagnetic linear actuators and the like. Furthermore, the specific orientation and attachment points of these actuators can be relocated to maximize mechanical efficiencies, adapt to tilt versus rake adjust configurations, and for packaging considerations.

A condition sensor 48 is incorporated into the vehicle's electronic system. The condition sensor 48 may comprise a single, discrete sensor, or may be a collection of sensors arranged in strategic locations about the vehicle. It can be a simple switch, a video surveillance device, a logic circuit, a softwarae routine, or any other feature capable of monitoring a given condition of the motor vehicle. The purpose of the condition sensor 48 is to monitor the vehicle for an emergency condition. The emergency condition can be a predetermined event, such as an unfastened seat belt, a door ajar, a particular engine alert warning, a driver drowsiness symptom such as prolonged eyelid closure or head bobbing, or an unsafe lane change detection. Alternatively, the emergency can be a non-predetermined event which is detected whenever a monitored condition deviates from the norm. In any event, the condition sensor 48 remains alert and active at all times while the motor vehicle is in operation. The condition sensor 48 may be of the type which, in prior art forms, results in an audible chime, recorded voice message, and/or lighted dash board display for communicating details about the emergency condition to the driver 16.

A haptic controller 50 is operatively coupled to the condition sensor 48. The haptic controller 50 may include a logic device or software routine which is responsive to the condition sensor 48 and capable of automatically energizing either one or both of the tilt and telescope actuators in response to the detection of an emergency condition. As a result of this unexpected movement of the steering wheel 14 to a different rotation plane, the driver 16 is mildly startled and thereby his attention is drawn to the emergency condition for corrective action. While the invention can be practiced through motion actuators that are not connected to the telescoping and tilt adjust motors 32, 40, it is convenient to use these preexisting actuators in motor vehicles so equipped.

FIG. 3 illustrates a condition where the haptic controller 50 energizes the motor 32 of the telescope actuator to translate the rotation plane B-B of the steering wheel 14 in reversing linear directions. FIG. 4 illustrates an alternative condition in which the haptic controller 50 actuates the motor 40 of the tilt actuator so as to tilt the rotation plane B-B of the steering wheel 14, together with the steering axis A, for the purpose of focusing the driver's attention on the emergency condition. In both situations, it is demonstrated that the rotation plane B-B of the steering wheel 14 is moved as a result of the haptic controller 50 responding to a sensed emergency condition. The frequency at which the movement direction is reversed can be rapid to create the sensation of vibration, or relatively slow if a milder sensation is desired. The frequency can be varied over time if corrective action is not taken. Alternatively, or in addition, the haptic controller 50 can vary the stroke of steering wheel if the problem persists. It is also possible that different frequencies and/or strokes can be assigned to different emergency conditions, so that more severe safety issues can be accompanied with more vigorous movements of the steering wheel 14.

Figure 5:
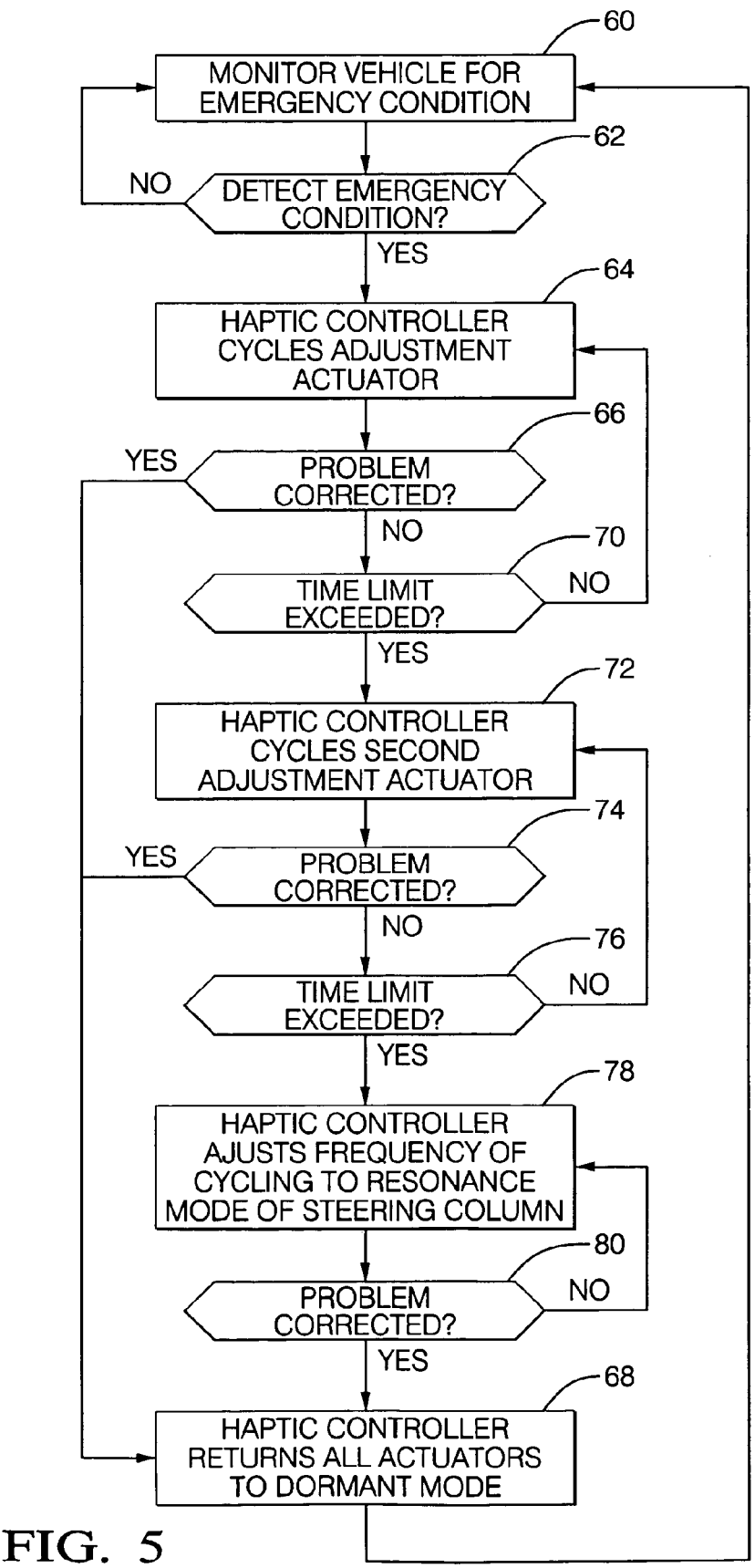
FIG. 5 is an exemplary logic diagram according to the method of the invention.

Referring now to FIG. 5, a simplified logic circuit describing the method of operation for the subject invention is provided. In function block 60, the condition sensor 48 is used to monitor the vehicle for an emergency condition. A query 62 is made to determine whether an emergency condition has been detected. Until an emergency condition is in fact detected, the condition sensor 48 and haptic controller 50 remain in this initial query loop by monitoring vehicle conditions. If the query 62 results in a positive detection for an emergency condition, the haptic controller 50 cycles one of the adjustment actuators as shown in function block 64. As stated previously, the haptic controller 50 can operate through either one of the servo-motors 32, 40 for the telescoping and tilt adjustment actuators, or can operate through an independent actuator if the vehicle is so equipped.

Once the haptic controller 50 begins actuating one of the adjustment actuators, a query 66 is made to determine whether the emergency condition has been abated. If the driver 16 takes immediate corrective action and overcomes the emergency condition, the haptic controller 50 returns the actuator to a dormant mode, as shown in function block 68. If the problem is not corrected, however, another query 70 is made to determine whether a pre-established time limit has been exceeded. For example, the logic may set a time limit of five seconds within which a driver 16 has an opportunity to correct the emergency condition. If the time limit has not been exceeded, the haptic controller continues cycling the first adjustment actuator at function block 64. This loop is repeated until the query 70 is returned in the affirmative, at which point the haptic controller 50 escalates the alerting function by initiating a second level warning function. At this stage, the haptic controller 50 begins cycling the other adjustment actuator at function block 72. For example, in function block 64, the haptic controller 50 may actuate the motor 32 of the telescope actuator in a first attempt to draw the driver's attention and overcome the emergency condition before the time limit is exceeded. Once the time limit is exceeded at query 70, the haptic controller 50 intensifies the warning function by simultaneously energizing the motor 40 of the tilting actuator. Thus, at function block 72, the steering wheel 14 may encounter both translating motions (as in FIG. 3) and tilting motions (as in FIG. 4). The stroke and frequency of these movements is carefully controlled to mildly alarm the driver 16 without unnecessarily frightening the driver 16 or introducing a sensation that the driver 16 has lost control of the vehicle. Queries 74 and 76 like those in 66 and 70, determine whether the emergency condition has been corrected and whether another time limit has been exceeded.

Once the second time limit in query 76 has been exceeded, haptic controller 50 may proceed to function block 78 where the frequency of the actuator cyclings for one or both of the motors 32, 40 can be brought into a resonance mode so that the steering column 20 produces an audible sound and shakes somewhat violently. In other words, the function block 78 represents the third warning level which can be given to the driver 16 by adjusting the power of the vibrations to the steering wheel 14 so that they cause an audible resonating noise. Query 80 allows this third and final warning sequence to be ended as soon as the emergency condition has been corrected. With this, the haptic controller 50 returns all actuators to the dormant mode in function block 68. The system then reverts back to function block 60 by monitoring the vehicle for emergency conditions.

Of course, other modifications of the system will be readily apparent to those skilled in the art. For example, the haptic controller 50 can be designed to move the steering wheel 14 in different directions depending upon the type of emergency condition detected. Such as, the steering wheel 14 may be translated by the telescoping actuator for low level safety issues like an engine warning light or door ajar. However, the haptic controller 50 may immediately initiate the third warning sequence as described in connection with function block 78 for severe safety issues such as the detection of driver drowsiness symptoms. In other words, for drastic situations a more severe warning can be initiated immediately rather than progressing through the sequence of steps detailed in FIG. 5.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly of the type for controlling one or more steerable wheels in a vehicle, said assembly comprising:

a steering column having a free end and a steering axis extending from said free end;

a steering wheel secured to said free end of said steering column for manual rotation by a driver in a plane generally perpendicular to said steering axis;

an adjustment actuator for relocating the rotation plane of said steering wheel to improve driver comfort;

a sensor for detecting the occurrence of an emergency condition; and a haptic controller responsive to said sensor for automatically energizing said adjustment actuator in response to the detection of said emergency condition whereby driver attention to said emergency condition is focused by the unexpected movement of said steering wheel to a different rotation plane.

2. The assembly of claim 1 wherein said adjustment actuator translates the rotation plane of said steering wheel.

3. The assembly of claim 1 wherein said adjustment actuator tilts the rotation plane of said steering wheel together with said steering axis.

4. The assembly of claim 1 wherein said emergency condition includes at least one of the following conditions: seat belt unfastened, door ajar, engine alert, driver drowsiness symptom, and unsafe lane change detection.

5. The assembly of claim 1 wherein said haptic controller creates an audible noise.

6. The assembly of claim 1 further including a second adjustment actuator for relocating the rotation plane of said steering wheel in a direction different than that of the first said adjustment actuator, said haptic controller automatically energizing said second adjustment actuator in the event said emergency condition persists for more than a predetermined period of time.

7. A method of alerting a driver of a vehicle to an emergency condition with the vehicle having a steering column defining a steering axis, a steering wheel rotatable about the steering axis in a rotation plane and an adjustment mechanism for moving the rotation plane of the steering wheel to improve driver comfort, said method comprising the steps of:

detecting the emergency condition; and automatically energizing the adjustment mechanism in response to the detection of the emergency condition to move the rotation plane of the steering wheel whereby driver attention to the emergency condition is focused by the unexpected movement of the steering wheel.

8. The method of claim 7 wherein said step of automatically energizing the adjustment mechanism to move the rotation plane of the steering wheel includes translating the rotation plane in linear reversing directions along the steering axis.

9. The method of claim 7 wherein said step of automatically energizing the adjustment mechanism to move the rotation plane of the steering wheel includes tilting the rotation plane in arcuate reversing directions.

10. The method of claim 7 wherein said step of detecting the emergency condition includes at least one of the following predetermined conditions: seat belt unfastened, door ajar, engine condition alert, driver drowsiness symptom, and unsafe lane change detection.

11. The method of claim 7 further including the step of creating an audible noise in response to the detection of the emergency condition.

12. The method of claim 7 wherein said step of automatically energizing the adjustment mechanism and moving the rotation plane includes simultaneously translating and tilting the rotation plane of the steering wheel if the emergency condition persists more than a predetermined period of time.

13. A method of alerting a driver of a vehicle to an emergency condition with the vehicle having a steering wheel rotatable in a steering plane, said method comprising the steps of:

detecting the emergency condition;

automatically moving the rotation plane of the steering wheel in response to the detection of the emergency condition;

escalating the movement of the rotation plane if the emergency condition persists more than a predetermined period of time.

14. A method as set forth in claim 13 wherein the step of escalating the movement of the rotation plane includes simultaneously translating and tilting the rotation plane of the steering wheel.

* * * * *